United States Patent
Ott et al.

(10) Patent No.: US 10,946,372 B2
(45) Date of Patent: Mar. 16, 2021

(54) METHOD FOR DETERMINING THE POSITION OF A ROBOTIC ARM IN A LIQUID HANDLING SYSTEM, AND A CORRESPONDING LIQUID HANDLING SYSTEM

(71) Applicant: TECAN TRADING AG, Mannedorf (CH)

(72) Inventors: Philipp Ott, Steg im Tosstal (CH); Markus Schoni, Nanikon (CH); Thomas Struchen, Gossau (CH); Raffael Bueler, Jona (CH); Nicolas Cors, Rapperswil (CH); Theo Meier, Hombrechtikon (CH); Daniel Kessler, Mannedorf (CH)

(73) Assignee: TECAN TRADING AG, Mannedorf (CH)

( * ) Notice: Subject to any disclaimer, the term of this patent is extended or adjusted under 35 U.S.C. 154(b) by 189 days.

(21) Appl. No.: 16/309,782

(22) PCT Filed: Jul. 21, 2017

(86) PCT No.: PCT/EP2017/068497
§ 371 (c)(1),
(2) Date: Dec. 13, 2018

(87) PCT Pub. No.: WO2018/015545
PCT Pub. Date: Jan. 25, 2018

(65) Prior Publication Data
US 2019/0128905 A1    May 2, 2019

(30) Foreign Application Priority Data

Jul. 22, 2016 (CH) .......................................... 950/16
Feb. 10, 2017 (CH) .......................................... 159/17
Apr. 19, 2017 (CH) .......................................... 523/17

(51) Int. Cl.
*B25J 9/16* (2006.01)
*B01L 3/02* (2006.01)
(Continued)

(52) U.S. Cl.
CPC ............. *B01L 3/0275* (2013.01); *B01L 3/021* (2013.01); *B01L 3/54* (2013.01); *B01L 9/54* (2013.01);
(Continued)

(58) Field of Classification Search
USPC .................................................. 700/245–264
See application file for complete search history.

(56) References Cited

U.S. PATENT DOCUMENTS 4,977,786 A * 12/1990 Davis .................... G01F 23/263
                                                       73/864.24
5,012,683 A *  5/1991 Davis .................... G01F 23/263
                                                       73/290 R
(Continued)

OTHER PUBLICATIONS

International Search Report for corresponding patent application No. PCT/EP2017/068497, dated Oct. 23, 2017.
(Continued)

*Primary Examiner* — Jonathan L Sample
(74) *Attorney, Agent, or Firm* — Notaro, Michalos & Zaccaria P.C.

(57) ABSTRACT

The present invention relates to a method for determining the position of a robotic arm in an automatic liquid handling system in which a measurement probe with a first electrode is arranged on the robotic arm and, together with a second electrode formed by at least part of a working area or at least part of a container or container carrier forms a measurement capacitor that is operatively connected to a measurement unit for measuring an impedance, in particular a capacitance of the measurement capacitor. The method involves moving the measurement probe along a first path, detecting a first
(Continued)

change in the impedance, in particular in the capacitance of the measurement capacitor at a first point on the first path, and defining at least one first reference spatial coordinate for a control unit of the robotic arm on the basis of the first point on the first path.

18 Claims, 2 Drawing Sheets

(51) Int. Cl.
*G01F 23/26* (2006.01)
*G01N 35/10* (2006.01)
*B01L 3/00* (2006.01)
*G01D 5/241* (2006.01)
*G01N 35/00* (2006.01)
*B01L 9/00* (2006.01)

(52) U.S. Cl.
CPC .............. *B01L 9/543* (2013.01); *B25J 9/1664* (2013.01); *G01D 5/2417* (2013.01); *G01F 23/263* (2013.01); *G01N 35/0099* (2013.01); *G01N 35/00584* (2013.01); *G01N 35/00732* (2013.01); *G01N 35/1011* (2013.01); *G01N 35/1016* (2013.01); *B01L 2200/0605* (2013.01); *B01L 2200/143* (2013.01); *B01L 2300/021* (2013.01); *B01L 2300/0645* (2013.01); *B01L 2400/049* (2013.01); *G01N 2035/00811* (2013.01); *G01N 2035/103* (2013.01); *G01N 2035/1013* (2013.01); *G01N 2035/1025* (2013.01); *G01N 2035/1034* (2013.01)

(56) References Cited

U.S. PATENT DOCUMENTS

| | | | | |
|---|---|---|---|---|
| 5,083,470 A | * | 1/1992 | Davis | G01F 23/263 73/864.24 |
| 5,265,482 A | * | 11/1993 | Davis | G01F 23/263 73/863.01 |
| 5,529,754 A | * | 6/1996 | Bonacina | G01B 7/023 324/519 |
| 2001/0047692 A1 | * | 12/2001 | Lipscomb | G01N 35/1016 73/864.25 |
| 2002/0095974 A1 | * | 7/2002 | Gilson | G01N 35/10 73/1.74 |
| 2010/0228513 A1 | * | 9/2010 | Roth | G01N 35/00732 702/94 |
| 2014/0234949 A1 | * | 8/2014 | Wasson | G01N 35/00871 435/287.2 |
| 2014/0296089 A1 | * | 10/2014 | Holmes | G01N 15/1475 506/9 |
| 2015/0114140 A1 | * | 4/2015 | Okuyama | G01N 35/1011 73/863.01 |
| 2016/0320381 A1 | * | 11/2016 | Holmes | B01L 3/0275 |

OTHER PUBLICATIONS

International Preliminary Report on Patentability and Written Opinion for corresponding PCT application No. PCT/EP2017/068497, dated Jan. 22, 2019.

* cited by examiner

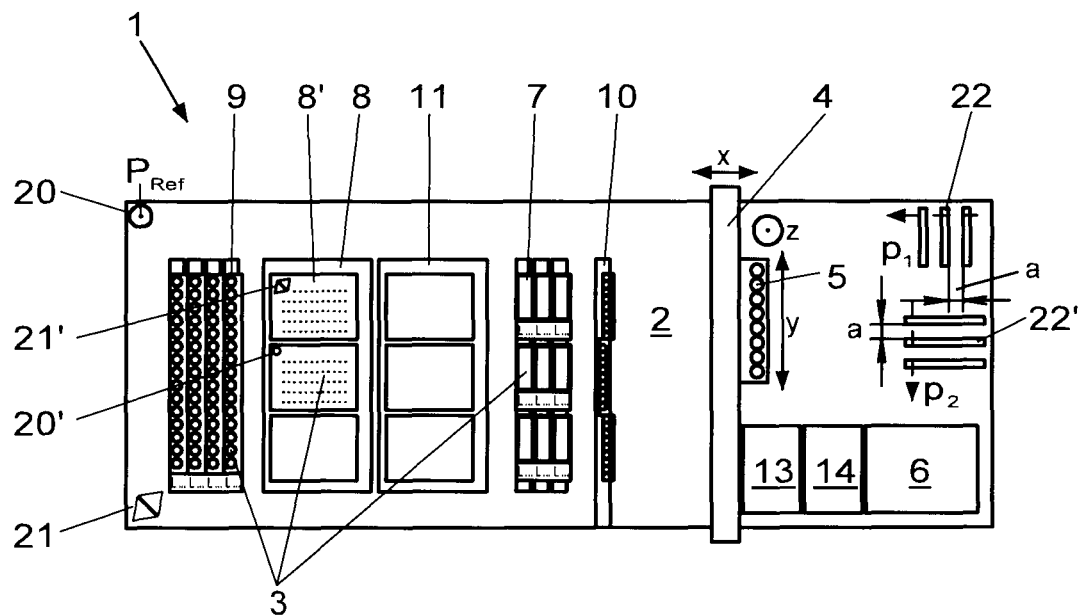
Fig. 1
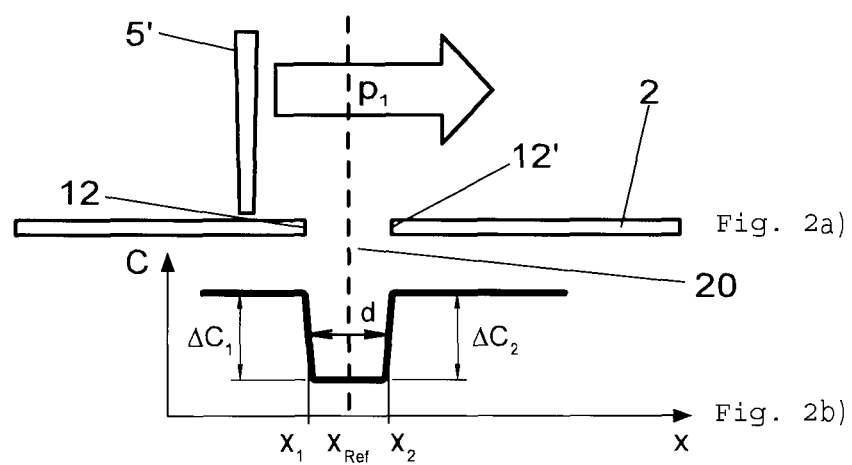
Fig. 2a)
Fig. 2b)

METHOD FOR DETERMINING THE POSITION OF A ROBOTIC ARM IN A LIQUID HANDLING SYSTEM, AND A CORRESPONDING LIQUID HANDLING SYSTEM

RELATED APPLICATIONS

The present application claims the priority of the Swiss patent application CH 00950/16 with filing date 22 Jul. 2016 and of the Swiss patent application CH 00159/17 with filing date 10 Feb. 2017 and of the Swiss patent application CH 00523/17 with filing date 19 Apr. 2017.

TECHNICAL FIELD OF THE INVENTION

The present invention relates to the technical field of automatic liquid handling systems (also called liquid handling workstations) or rather liquid processing systems and relates to methods for the (reference) position determination of a robot arm, in particular a pipette tip or a gripper finger on a robot arm, in such a system. Furthermore, an automatic liquid handling system having a robot arm which is designed to execute an accurate position determination of the robot arm (or rather a pipette tip or a gripper finger on the robot arm) and uses of the position determination method are specified.

BACKGROUND OF THE INVENTION

When large quantities of samples have to be examined in medical, chemical, analytical or pharmaceutical laboratories, automated laboratory systems or rather installations are usually used today to enable rapid and reliable processing of each individual sample. Such laboratory systems are often designed as liquid processing systems for handling liquid volumes, and are suitable for performing certain operations with these samples, such as optical measurements, pipetting, washing, centrifuging, incubating, and filtering. In this case, one or more robot (arms), for example, pipetting robot (arms) or logistics robot (arms) are typically used for the fully automatic operation of such laboratory systems. These robots are specialized in particular in dealing with liquid containers, for example, sample tubes or microplates, in which the liquid samples are located. Such liquid processing systems comprise in particular pipettors both for aspirating and dispensing liquids or dispensers for dispensing liquids.

In view of the often very small dimensions of the sample containers, for example, the sample tubes or cavities (so-called "wells") in a microplate, particularly accurate positioning by the pipetting robot, for example, of the pipette tip, is necessary. Mechanical tolerances limit the accuracy with which the robot arm or rather the pipette tip arranged thereon can be positioned. It is therefore often necessary upon startup of the robot to move it to a specific reference position inside the liquid handling system for the purpose of position calibration. There is an array of different known methods for this purpose. This can be carried out manually, for example, by the robot arm being guided by a person to a specific point. This point can be provided, for example, with a corresponding mark, so that it can be detected by means of a camera. The robot arm can thus automatically be controlled with the aid of the camera at the reference position. Alternatively, a (line) laser system, which functions without camera, can be used for the accurate optical position determination. Furthermore, it is possible to "feel" the reference position automatically, by the robot registering based on force measurements that it touches, for example, a stop at the reference position.

Because of movement tolerances, it can also be necessary to perform a position calibration periodically during the operation of the liquid handling system.

The need therefore exists in automatic liquid handling systems for means which enable a simple and therefore cost-effective and also reliable and accurate (reference) position determination or rather position calibration. These means are also to enable the position to be set or rather calibrated accurately periodically during the operation of the liquid handling system.

SUMMARY OF THE INVENTION

It is an object of the present invention to propose a method for (reference) position determination of a robot arm in an automatic liquid handling system, which can be executed automatically, simply, and with high accuracy. This object is achieved according to the invention by the method defined in claim 1.

It is moreover an object of the present invention to provide a liquid handling system having a robot arm, which is designed to execute an accurate position determination of the robot arm. This object is achieved according to the invention by the automatic liquid handling system according to claim 16.

It is furthermore an object of the present invention to specify uses of the proposed method for the (reference) position determination. This object is achieved according to the invention by the uses specified in claims 17 and 18.

Specific embodiment variants according to the invention are specified in the dependent claims.

According to a first aspect of the present invention, the following method according to the invention is proposed for the (reference) position determination of a robot arm in an automatic liquid handling system. The liquid handling system comprises a substantially horizontally aligned worksurface for the placement of containers or container carriers and at least one robot arm having a drive, for example, a pipetting robot having at least one pipette for aspirating and/or dispensing liquid samples or a logistics robot having at least one gripper finger for moving the containers or container carriers, and a control unit which is operationally connected to the robot arm, wherein a measuring probe having a first electrode is arranged on the robot arm which, together with a second electrode which is formed by at least a part of the worksurface or at least a part of a container or container carrier, forms a measuring capacitor, which is operationally connected to a measuring unit for measuring an impedance, in particular a capacitance, of the measuring capacitor. It is to be noted at this point that the complex-valued impedance of the measuring capacitor has a resistive component in addition to a capacitive component (at least under certain circumstances). Therefore, reference is often made hereafter to an impedance measurement and not only to a capacitance measurement. The method according to the invention has the following steps:

a) moving the measuring probe along a first path, in particular a (substantially) horizontal path over the worksurface or the container or container carrier;

b) detecting a first change of the impedance, in particular the capacitance, of the measuring capacitor at a first point of the first path;

c) establishing at least one first reference space coordinate, for example, an x, y, or z coordinate, for the control unit based on the first point of the first path.

In one embodiment, the method furthermore comprises, before step a), the following step:
vertically lowering the measuring probe until a predefined value of the capacitance of the measuring capacitor is reached or exceeded.

In a further embodiment, the method furthermore comprises the following steps:
d) detecting a second change of the impedance, in particular the capacitance, of the measuring capacitor at a second point of the first path;
e) establishing at least one second reference space coordinate, for example, the x, y, or z coordinate, for the control unit based on the second point of the first path; and/or
f) establishing a reference distance for the control unit based on the first point of the first path and the second point of the first path.

In a further embodiment, the method furthermore comprises the following steps:
moving the measuring probe along a second (substantially) horizontal path over the worksurface or the container or container carrier;
detecting a further change of the impedance, in particular the capacitance, of the measuring capacitor at a first point of the second path;
establishing at least one or rather the second reference space coordinate, for example, the x, y, or z coordinate, for the control unit based on the first point of the second path; and/or
establishing a or rather the reference distance for the control unit based on the first point of the first path and the first point of the second path.

In a further embodiment of the method, the worksurface and/or the container or container carrier has at least one edge, at which the impedance, in particular the capacitance, of the measuring capacitor changes, and at which in particular a change of a conductivity or a dielectric constant takes place along the first or rather second path.

In a further embodiment of the method, the worksurface and/or the container or container carrier has at least one material transition, which causes the first, second, or further change of the impedance, in particular the capacitance, of the measuring capacitor, and at which in particular a change of a conductivity or dielectric constant takes place along the first or rather second path.

In a further embodiment of the method, the worksurface and/or the container or container carrier has at least one recess or depression, for example, a hole, a slot, or a trough, which causes the first, second, and/or further change of the impedance, in particular the capacitance, of the measuring capacitor, and at which in particular a change of a conductivity or dielectric constant takes place along the first or rather second path.

In a further embodiment of the method, the recess or depression is triangular or trapezoidal, and the worksurface and/or the container or container carrier has in particular two identical triangular or trapezoidal recesses or depressions, which are in particular arranged pivoted by 180° in relation to one another, and both recesses or depressions are traversed by the first and the second path.

In a further embodiment, the method furthermore comprises the following steps:
lowering the measuring probe in the vertical direction at the edge, in particular into the at least one recess or depression;
detecting an additional change of the impedance, in particular the capacitance, of the measuring capacitor at a point in the vertical direction;
establishing a third, vertical reference space coordinate, for example, the z coordinate, for the control unit based on the point in the vertical direction.

In a further embodiment, the method furthermore comprises the following steps:
moving the measuring probe along a (substantially) horizontal path in the at least one recess or depression, in particular between two edges of the at least one recess or depression;
detecting at least one still further additional change of the impedance, in particular the capacitance, of the measuring capacitor at at least one point in the horizontal direction;
establishing the first and/or second horizontal reference space coordinate, for example, the x and/or y coordinate, for the control unit based on the at least one point in the horizontal direction.

In a further embodiment of the method, an absolute capacitance of the measuring capacitor is ascertained during the movement of the measuring probe along the first or rather second path, wherein the absolute capacitance of the measuring capacitor is in particular ascertained periodically in time and/or at regular position intervals.

In a further embodiment of the method, the detection of the first, second, further, or additional change of the impedance, in particular the capacitance, of the measuring capacitor, in particular the absolute capacitance of the measuring capacitor, is based on a slope of a time curve, in particular on an increase of the slope, of the measured capacitance of the measuring capacitor.

In a further embodiment of the method, the steps a) to c) or rather a) to f) are carried out multiple times, in particular to achieve enhanced accuracy of the first and/or second reference space coordinate, for example, the x and/or y coordinate, and/or the reference distance.

In a further embodiment of the method, the detection of the first, second, further, or additional change of the impedance, in particular the capacitance, of the measuring capacitor comprises averaging and/or noise filtering.

In a further embodiment of the method, the measuring probe is formed by a pipette tip (in the case of a pipetting robot), in particular by a disposable pipette tip ("disposable tip") or a steel cannula tip ("fixed tip"), or a gripper finger (in the case of a logistics robot).

According to a second aspect of the present invention, an automatic liquid handling system according to the invention comprises a substantially horizontally aligned worksurface for the placement of containers or container carriers and at least one robot arm having a drive, for example, a pipetting robot having at least one pipette for aspirating and/or dispensing liquid samples or a logistics robot having at least one gripper finger for moving the containers or container carriers, and a control unit which is operationally connected to the robot arm, wherein a measuring probe having a first electrode is arranged on the robot arm which, together with a second electrode which is formed by at least a part of the worksurface or at least a part of a container or container carrier, forms a measuring capacitor, which is operationally connected to a measuring unit for measuring an impedance, in particular a capacitance, of the measuring capacitor, and the measuring unit is connected to an analysis unit, wherein the control unit, the measuring unit, and the analysis unit are designed and configured for the purpose of executing the above-proposed method according to the invention for (reference) position determination of a robot arm.

According to a third aspect of the present invention, a use according to the invention of the above-proposed method according to the invention consists of determining a reference position and/or a reference distance upon startup of an automatic liquid handling system and in particular during operation of the automatic liquid handling system, in particular in the meaning of an initial calibration or a running calibration, respectively, of a reference position and/or a reference distance.

A further use according to the invention of the above-proposed method according to the invention consists of determining a position of an opening of a container, for example, a sample tube or a cavity (so-called "well") in a microplate, in particular in relation to a pipette tip, which is to be lowered into the opening, in particular during running operation of an automatic liquid handling system, and furthermore in particular based on a reference position and/or reference distance previously determined by means of the method according to any one of claims 1 to 15 on a container carrier, in particular a microplate having a plurality of cavities.

BRIEF DESCRIPTION OF THE DRAWINGS

Nonlimiting embodiment examples of the present invention are explained in more detail below by reference to the figures. In the figures:

FIG. 1 shows a top view of the worksurface of a liquid handling system having a pipetting robot, wherein different pieces of labware (container (carriers)) are placed on the worksurface;

FIG. 2a) shows a cross-section of a worksurface having a recess,

FIG. 2b) shows measured capacitance of the measuring capacitor as a function of the x coordinate of the measuring probe.

In the figures, identical reference numerals relate to identical elements.

DETAILED DESCRIPTION OF THE INVENTION

Figure 3:
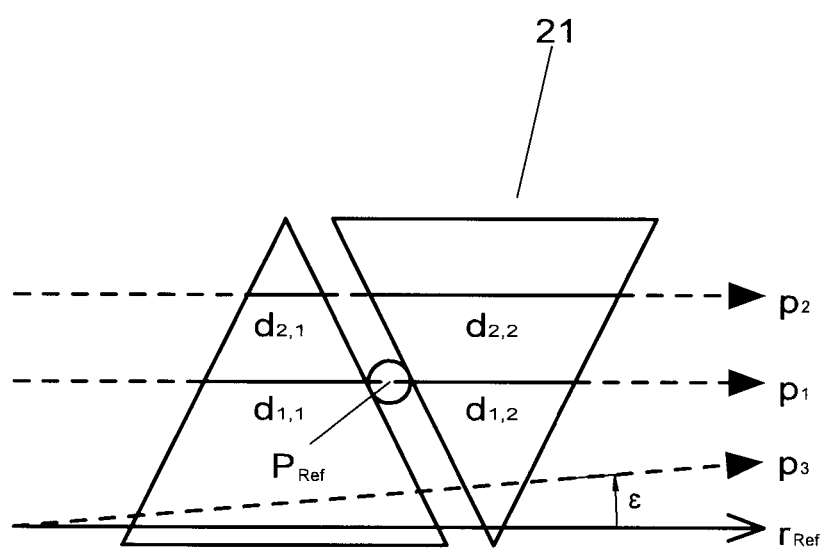
FIG. 3 shows a top view of a worksurface having two triangular recesses arranged pivoted by 180° in relation to one another.

FIG. 1 shows a top view of a worksurface 2 of an automatic liquid handling system 1 having a pipetting robot 4, wherein different containers 3 are placed on the worksurface 2. A selection of containers 3 such as sample tubes 9, which are placed, for example, in so-called "racks" on the worksurface 2 of the liquid handling system 1 or microplates 8 having, for example, 24, 96, 384, or 1536 cavities/wells is shown here. The containers 3 also include so-called troughs 7 and further containers (not shown here) for at least temporarily storing liquids. The liquid handling system 1 furthermore comprises a pipetting robot 4 driven by a motor having at least one pipette 5 for aspirating and dispensing liquid samples. A pipetting robot 4 is shown here which can be moved in the longitudinal axis of the liquid handling system 1 (i.e., in the x direction), and which has eight pipettes 5 each having one pipette tip, which can be moved transversely over the worksurface 2 of the liquid handling system 1 in a direction (y axis) perpendicular to the x axis and can be lowered to this worksurface 2 at any arbitrary location. Each pipette 5 is attached to a vertically arranged "z rod", which may be moved up and down, i.e., in the "z direction", by means of a drive, so that the pipette 5 fastened thereon may be (vertically) lowered or rather raised by the z rod. Furthermore, each pipette 5 is fluidically connected via an individual line to an activatable pump. This means that a liquid (for example, system liquid), a gas (for example, inert gas), or a combination of the two (for example, system liquid with "air gap") is present between the conveying element of the pump and the pipette 5 or rather its pipette tip, using which a liquid sample is to be aspirated or rather dispensed. Two container carriers 11 (so-called "carriers"), which are designed in this case for carrying three microplates, are also shown. Moreover, a washing station 10 is shown, in which the pipette tips can be flushed using one or more washing liquids. Moreover, the liquid handling system 1 comprises a control unit 6, using which the pipetting robot 4 (or rather its drives (not shown here)) and its pumps (or rather its drives (also not shown here)) are operationally connected. At least parts of a control program activated in this control unit 6 enable the pipetting robot 4 to position the at least one pipette 5 at specific positions on the worksurface 2 and execute a specific action there using the at least one pipette 5. These specific actions are known to any person skilled in the art in the field of liquid handling and comprise the receiving, flushing, and/or discarding of a pipette tip and also the aspiration, mixing, and/or dispensing of a volume of a liquid sample. Depending on the selected action or sequence of selected actions, the control program enables the pipetting robot 4 to execute them.

The problem which results now because of mechanical tolerances is that the accurate position of the pipetting robot (arm) 4 or rather the pipette tips arranged on the pipettes 5 is not accurately known. This can result in problems in particular if so-called "high-density plates" are used, i.e., microplates 8 having 384 or 1536 cavities/wells. It is therefore necessary to perform a position calibration upon startup of the liquid handling system 1. This is performed according to the invention with the aid of impedance measurements (for determining both a resistive (=real part) and also a capacitive (=imaginary part) component of a complex-valued impedance), in particular of capacitance measurements, wherein a measuring probe having a first electrode is arranged on the robot arm which, together with a second electrode which is formed by at least a part of the worksurface 2 or at least a part of a container 3 or container carrier 11, forms a measuring capacitor (having a complex-valued impedance), which is operationally connected to a measuring unit 13 for measuring a capacitance of the measuring capacitor. Ideally, a pipette tip is used as the measuring probe in the case of a pipetting robot 4. In the case of a logistics robot, it is preferably one of the gripper fingers which is used as the measuring probe in each case. FIG. 2a) shows a cross section of a worksurface 2 having a recess 20 in the form of a round hole. The measuring probe in the form of the pipette tip 5', which forms the measuring capacitor here together with the worksurface 2, is firstly lowered vertically (i.e., in the z direction) by the pipetting robot 4 until it is located just above the worksurface 2 (for example, at a distance less than 1 mm). To determine this distance, the capacitance of the measuring capacitor is continuously measured using the measuring unit 13 during the movement of the pipette tip 5', until it reaches a specific value, which is characteristic for the desired distance of the pipette tip 5' from the worksurface 2. The pipette tip 5' is then moved along a horizontal path $p_1$ (i.e., in the x/y direction) over the worksurface 2, which leads over the hole 20. By way of continuous measurement of the capacitance C of the measuring capacitor it is possible to detect the edge 12 of the hole 20, which manifests as a sudden decrease ($\Delta C_1$) of the capacitance C, as is shown in the measured curve of the capacitance C as a function of the x position in FIG. 2b). After the pipette tip 5' has traversed the hole 20, the second edge 12' of the hole 20 is indicated by a sudden increase ($\Delta C_2$) of the capacitance C. The analysis unit 14 can determine two variables on the basis of the positions $x_1$ and $x_2$, at which the capacitance changes $\Delta C_1$ and $\Delta C_2$ have taken place. The (reference) diameter d of the hole 20 (and in a corresponding manner a distance a; see FIG. 1) can be ascertained from the difference $x_2-x_1$, which can be used by the control unit 6 as a calibrated reference distance in the x direction. Furthermore, the center of the hole 20 of the control unit 6 is used as a calibrated reference space coordinate $x_{Ref}$ ($=x_1+d/2$) in the x direction.

For the calibration of the reference distance in the y direction, the pipette tip 5' is subsequently moved along a second horizontal path $p_2$ (i.e., in the x/y direction), which extends perpendicularly to $p_1$, over the worksurface 2 and the hole 20. A calibrated reference space coordinate is thus also ascertained in the y direction, which is used together with the ascertained reference distance in the y direction by the control unit 6.

For more accurate determination of the hole diameter 20, the pipette tip 5', for example, after a first traversal of the hole 20, which is used for the (rough) determination of the positions $x_1$ and $x_2$ of the edges 12 and 12', can be lowered into the hole 20, which results in an increase of the measured capacitance C of the measuring capacitor. Furthermore, the accuracy of the position or rather distance determination can be further enhanced by executing multiple measurements and averaging the measurement results, which results in noise reduction.

The hole 20 can be sealed, for example, by a material which has a different dielectric constant or conductivity than the worksurface 2. In order that the worksurface 2 acts as an electrode, it is ideally made of metal, while in contrast the hole 20 could be sealed, for example, using an insulator, for example, a nonconductive plastic, in order to prevent, for example, problem liquids from being able to drain off through the hole 20. The described position determination method would also function in such a way, since upon the transition of materials having different dielectric constants or different conductivities, corresponding capacitance jumps would occur.

Instead of recesses such as holes 20, depressions such as grooves can also be used as reference position marks or rather as reference position determination identifiers. Alternatively, slots 22, 22' aligned differently (in the x and y directions) can also be used, as is shown in FIG. 1 in the top right corner of the worksurface 2. To enhance the accuracy, a series of multiple slots 22, 22' can be arranged in succession in each direction. Thus, for example, a juxtaposition of a plurality of equidistant slots 22, 22' can only be traversed once by the measuring probe 5' and the results can be averaged to determine a reference distance a, instead of traversing a slot back and forth multiple times to obtain an average result for the reference distance a.

FIG. 3 shows a further possibility for position determination or rather calibration. For this purpose, two triangular recesses 21 arranged pivoted by 180° in relation to one another are used on the worksurface 2. Upon the traversal of these two recesses 21 along the path $p_1$ in the center of these triangles, the two routes $d_{1,1}$ and $d_{1,2}$ are of equal length, wherein the reference point $P_{Ref}$ has to be located precisely between these two routes $d_{1,1}$ and $d_{1,2}$. However, if the path is offset away from the center, for example, like the path $p_2$ in FIG. 3, the two sections $d_{2,1}$ and $d_{2,2}$ are thus of different lengths. Based on the shape and size of the recesses 21 and the ratio $d_{2,1}/d_{2,2}$ of the two sections $d_{2,1}$ and $d_{2,2}$, the analysis unit 14 can accurately determine the offset and thus the position of the reference point $P_{Ref}$. Moreover, the angle error $\varepsilon$, i.e., a direction deviation of a path (see path $p_3$ in FIG. 3) may be determined from a reference direction $r_{Ref}$. This information is relevant, for example, (in production) for the alignment of the robot arms. These have to be adjusted at 90° in relation to the x axis. If this is not the case, for example, one movement path would not be parallel to the long edge of the worksurface. Since the geometry of the triangles and the movement direction are known, this angle error $\varepsilon$ may be computed.

The proposed method for position determination is advantageous in particular if disposable pipette tips are used. The problem which occurs in this case is that the disposable pipette tips themselves can be formed slightly differently as a result of mechanical manufacturing tolerances, or rather the position of the pipette tip opening is not accurately known, for example, also if the tip was attached to the pipette tube slightly skewed. To remove this uncertainty, a position calibration according to the method according to the invention is carried out every time a new disposable pipette tip has been attached to the pipette tube.

This also applies similarly if microplates having a large number of cavities/wells, for example, 384 or 1536 are used. The position of the individual wells is dependent on the positioning accuracy (and the manufacturing accuracy) of the microplates in this case. It is therefore proposed after the depositing of a microplate, that its accurate position be ascertained by means of the method according to the invention for position determination. For this purpose, corresponding reference position marks 20', 21' or rather reference position determination identifiers are applied directly to the microplates or to the carriers on which the microplates are fastened, as shown in FIG. 1.

LIST OF REFERENCE NUMERALS 1 automatic liquid handling system
2 worksurface
3 container
4 pipetting robot (arm)
5 pipette
5' measuring probe, pipette tip
6 control unit
7 trough
8 microplate
8' cavity/well
9 sample tube
10 washing station
11 container carrier/carrier
12, 12' edge
13 measuring unit
14 analysis unit
20, 20' hole
21, 21' triangular recess
22, 22' slot
a (reference) distance/distance
C capacitance of the measuring capacitor
$\Delta C_1$, $\Delta C_2$ change of the capacitance of the measuring capacitor
d, $d_{i,j}$ (reference) diameter ε angle error/direction deviation of a path from a reference direction
$p_1, p_2, p_3$ path
$P_{Ref}$ reference position
$r_{Ref}$ reference direction
$x_1, x_2$ x position
$x_{Ref}$ x reference coordinate
x first horizontal direction
y second horizontal direction
z vertical direction

The invention claimed is:

1. A method for position determination of a robot arm (4) in an automatic liquid handling system (1) comprising a substantially horizontally aligned worksurface (2) for the placement of containers (3) or container carriers (11) and at least one robot arm (4) having a drive, for example, a pipetting robot (4) having at least one pipette (5) for aspirating and/or dispensing liquid samples or a logistics robot having at least one gripper finger for moving the containers (3) or container carriers (11), and a control unit (6) which is operationally connected to the robot arm (4), wherein a measuring probe (5') having a first electrode is arranged on the robot arm (4), which, together with a second electrode, which is formed by at least a part of the worksurface (2) or at least a part of the container (3) or container carrier (11) forms a measuring capacitor, which is operationally connected to a measuring unit (13) for measuring an impedance, in particular a capacitance (C), of the measuring capacitor, wherein the method has the following steps:
   a) moving the measuring probe (5') along a first path (p1), in particular a substantially horizontal path over the worksurface (2) or the container (3) or container carrier (11);
   b) detecting a first change (ΔC1) of the impedance, in particular of the capacitance (C), of the measuring capacitor at a first point (x1) of the first path (p1);
   c) establishing at least one first reference space coordinate (xRef) for the control unit (6) based on the first point (x1) of the first path (p1),
   d) detecting a second change (ΔC2) of the impedance, in particular a capacitance (C), of the measuring capacitor at a second point (x2) of the first path (p1);
   and at least one of the following steps:
   e) establishing at least one second reference space coordinate for the control unit (6) based on the second point (x2) of the first path (p1);
   f) establishing a reference distance (d, a) for the control unit (6) based on the first point (x1) of the first path (p1) and the second point (x2) of the first path (p1).

2. The method according to claim 1, furthermore comprising, before the step a), the following steps:
   vertically lowering the measuring probe (5') until a predefined value of the capacitance (C) of the measuring capacitor is reached.

3. The method according to claim 1, furthermore comprising the following steps:
   moving the measuring probe (5') along a second substantially horizontal path (p2) above the worksurface (2) or the container (3) or container carrier (11);
   detecting a further change of the impedance, in particular a capacitance (C), of the measuring capacitor at a first point of the second path (p2);
   and at least one of the following steps:
   establishing at least one or rather the second reference space coordinate for the control unit (6) based on the first point of the second path (p2);
   establishing a or rather the reference distance (a) for the control unit (6) based on the first point (x1) of the first path (p1) and the first point of the second path (p2).

4. The method according to claim 1, wherein the worksurface (2) and/or the container (3) or container carrier (11) has at least one edge (12), at which, during the movement of the measuring probe (5'), the impedance, in particular the capacitance (C), of the measuring capacitor changes, and at which in particular a change of a conductivity or dielectric constant takes place along the first or rather second path (p1, p2).

5. The method according to claim 1, wherein the worksurface (2) and/or the container (3) or container carrier (11) has at least one material transition, which, during the movement of the measuring probe (5'), causes the first, second, or further change (ΔC1, ΔC2) of the impedance, in particular the capacitance (C), of the measuring capacitor, and at which in particular a change of a conductivity or dielectric constant takes place along the first or rather second path (p1, p2).

6. The method according to claim 1, wherein the worksurface (2) and/or the container (3) or container carrier (11) has at least one recess or depression which, during the movement of the measuring probe (5'), causes the first, second, or further change (ΔC1, ΔC2) of the impedance, in particular the capacitance (C), of the measuring capacitor.

7. The method according to claim 6, wherein the recess (21, 21') or depression is triangular or trapezoidal, and wherein the worksurface (2) and/or the container (3) or container carrier (11) in particular has two identical triangular or trapezoidal recesses (21, 21') or depressions, which are arranged in particular pivoted by 180° in relation to one another, and wherein the first and the second path (p1, p2) traverses both recesses (21, 21') or depressions.

8. The method according to claim 4, furthermore comprising the following steps:
   lowering the measuring probe (5') in the vertical direction (z) at the edge (12), in particular into the at least one recess (20, 20', 21, 21', 22, 22') or depression;
   detecting an additional change of the impedance, in particular the capacitance (C), of the measuring capacitor at a point in the vertical direction (z);
   establishing a third, vertical reference space coordinate for the control unit (6) based on the point in the vertical direction (z).

9. The method according to claim 8, furthermore comprising the following steps:
   moving the measuring probe (5') along a substantially horizontal path in the at least one recess (20, 20', 21, 21', 22, 22') or depression, in particular between two edges (12, 12') of the at least one recess (20, 20', 21, 21', 22, 22') or depression;
   detecting at least one still further additional change of the impedance, in particular the capacitance (C), of the measuring capacitor at at least one point in the horizontal direction (x, y);
   establishing the first and/or second horizontal reference space coordinate for the control unit (6) based on the at least one point in the horizontal direction (x, y).

10. The method according to claim 1, wherein, during the movement of the measuring probe (5') along the first path an absolute capacitance of the measuring capacitor is ascertained, wherein the absolute capacitance of the measuring capacitor is in particular ascertained periodically in time and/or at regular position intervals.

11. The method according to claim 1, wherein the detection of the first, second, further, or additional change (ΔC1, ΔC2) of the impedance, in particular the capacitance (C), of the measuring capacitor, in particular the absolute capacitance of the measuring capacitor, is based on a slope of a time curve, in particular on an increase of the slope, of the measured capacitance of the measuring capacitor.

12. The method according to claim 1, wherein the steps a) to f) are carried out multiple times, in particular to achieve enhanced accuracy of the first and/or second reference space coordinate and/or the reference distance.

13. The method according to claim 1, wherein the detection of the first, second, further, or additional change of the impedance, in particular the capacitance (C), of the measuring capacitor comprises averaging and/or noise filtering.

14. The method according to claim 1, wherein the measuring probe is formed by a pipette tip (5'), in particular by a disposable pipette tip or a steel cannula tip, or a gripper finger.

15. An automatic liquid handling system (1) comprising a substantially horizontally aligned worksurface (2) for the placement of containers (3) or container carriers (11) and at least one robot arm (4) having a drive and a control unit (6) which is operationally connected to the robot arm (4), wherein a measuring probe (5') having a first electrode is arranged on the robot arm (4), which, together with a second electrode, which is formed by at least a part of the worksurface (2) or at least a part of the container (3) or container carrier (11) forms a measuring capacitor, which is operationally connected to a measuring unit (13) for measuring an impedance, in particular a capacitance (C), of the measuring capacitor, and the measuring unit (13) is connected to an analysis unit (14), wherein the control unit (6), the measuring unit (13), and the analysis unit (14) are adapted and configured to execute the following steps:
  a) moving the measuring probe (5') along a first path (p1), in particular a substantially horizontal path over the worksurface (2) or the container (3) or container carrier (11);
  b) detecting a first change ($\Delta C1$) of the impedance, in particular of the capacitance (C), of the measuring capacitor at a first point (x1) of the first path (p1);
  c) establishing at least one first reference space coordinate (xRef) for the control unit (6) based on the first point (x1) of the first path (p1),
  d) detecting a second change ($\Delta C2$) of the impedance, in particular a capacitance (C), of the measuring capacitor at a second point (x2) of the first path (p1);
  and at least one of the following steps:
  e) establishing at least one second reference space coordinate for the control unit (6) based on the second point (x2) of the first path (p1);
  f) establishing a reference distance (d, a) for the control unit (6) based on the first point (x1) of the first path (p1) and the second point (x2) of the first path (p1).

16. The method according to claim 1 comprising determining a reference position (PRef) and/or a reference distance (a) upon startup of an automatic liquid handling system (1) and in particular during operation of the automatic liquid handling system (1), in particular in the meaning of an initial calibration or a running calibration, respectively, of a reference position (PRef) and/or a reference distance (a).

17. The method according to claim 1 comprising determining a position of an opening of a container, in particular in relation to a pipette tip (5'), which is to be lowered into the opening, in particular during running operation of an automatic liquid handling system (1), and furthermore in particular based on a reference position (PRef) and/or a reference distance (a) previously determined by means of the method according to claim 1 on a container carrier (11), in particular a microplate (8) having a plurality of cavities (8').

18. The system according to claim 15, wherein the at least one robot arm (4) is a pipetting robot (4) having at least one pipette (5) for aspirating and/or dispensing liquid samples or a logistics robot having at least one gripper finger for moving the containers (3) or container carriers (11).

* * * * *